Dec. 1, 1953  J. E. GAULKE  2,660,921
ILLUMINATED STEREOSCOPE
Filed July 21, 1951
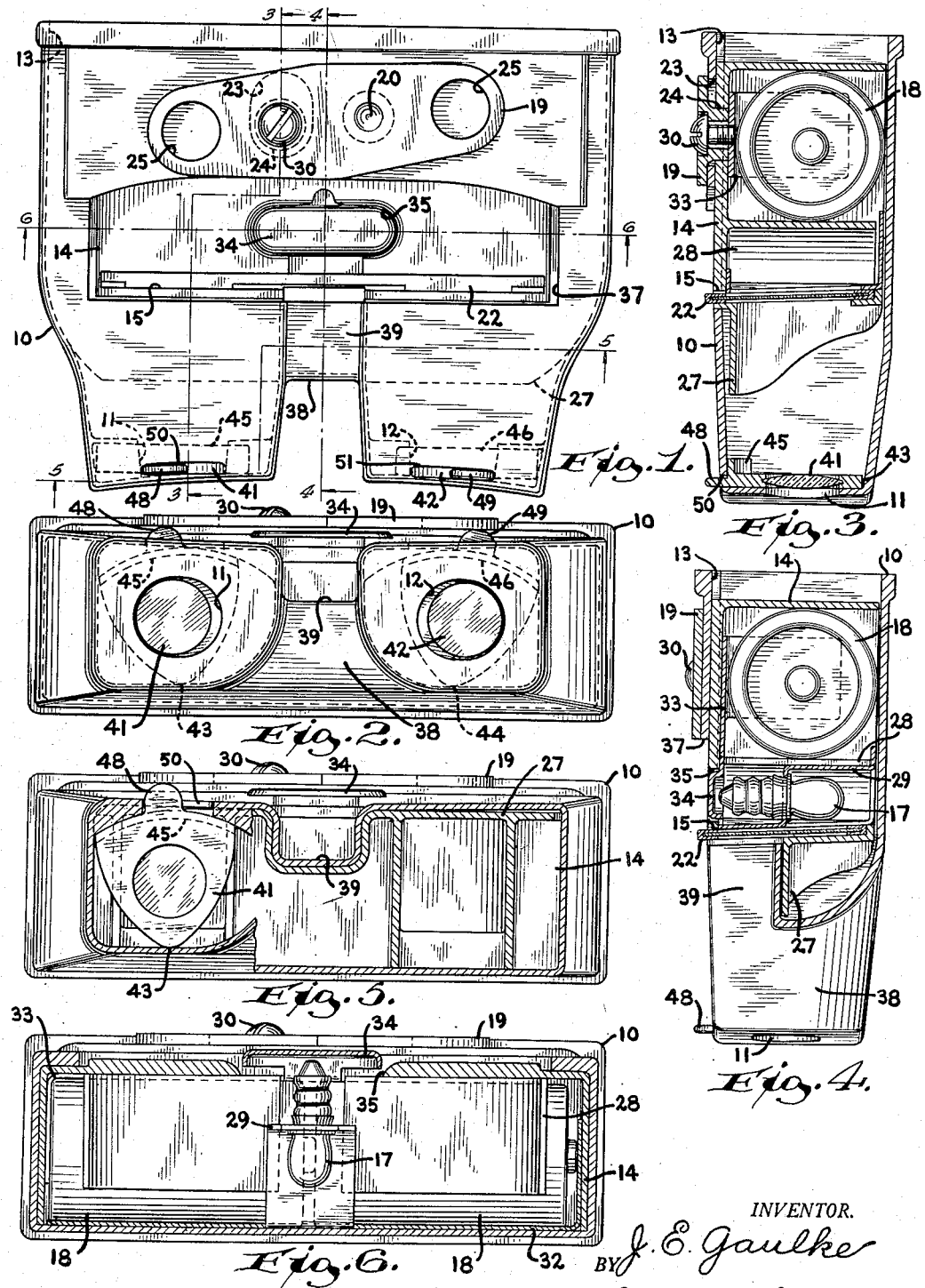
INVENTOR.
J. E. Gaulke
BY Lieber & Lieber
ATTORNEYS.

Patented Dec. 1, 1953

2,660,921

UNITED STATES PATENT OFFICE 2,660,921

ILLUMINATED STEREOSCOPE

John E. Gaulke, Milwaukee, Wis.

Application July 21, 1951, Serial No. 237,949

5 Claims. (Cl. 88—29)

The present invention relates generally to improvements in the art of visual picture display, and relates more particularly to improvements in the construction and operation of illuminated stereoscopes.

A primary object of my present invention is to provide an improved illuminated stereoscope which is extremely simple and compact in construction, and which is moreover highly efficient in actual operation.

It is a more specific object of this invention to provide an improved portable picture viewing device which is composed of a minimum number of parts, all of which are readily accessible for quick and easy replacement and/or repair.

Another specific object of the invention is to provide an improved stereoscope adapted to be illuminated at the will of a novice by means of ordinary flashlight batteries and bulb in cooperation with simple switch mechanism.

Still another specific object of my invention is to provide an improved illuminated stereoscope in which all parts may be readily assembled to form an exceedingly durable and inexpensive unit, and in which most parts may be conveniently formed of molded plastic or the like.

An additional specific object of the present invention is to provide an improved illuminated stereoscope in which the relative position of the lenses may be easily independently adjusted to suit the requirements of the individual viewer, and in which the distance of the pictures and light source from the lenses may likewise be readily adjusted by extremely simple means for focusing purposes.

A further specific object of the present invention is to provide an improved portable picture display device comprising, a main casing provided with spaced sight openings in one end thereof, an auxiliary casing slidably confined within the main casing and having a picture receiving opening therein, illuminating means housed within the auxiliary casing, and means for moving the auxiliary casing toward and away from the sight openings.

These and other specific objects and advantages of the invention will be apparent from the following detailed description.

A clear conception of the several features constituting my present improvement, and of the mode of constructing and of utilizing portable illuminated stereoscopes embodying the invention, may be had by referring to the drawing accompanying and forming a part of this specification, wherein like reference characters designate the same or similar parts in the various views.

Fig. 1 is a top view of a typical stereoscope constructed in accordance with the present invention;

Fig. 2 is an end view of the improved device, taken from the sight end;

Fig. 3 is a longitudinal vertical section through the stereoscope, taken along the irregular line 3—3 of Fig. 1;

Fig. 4 is another longitudinal vertical section thereof, taken along the line 4—4 of Fig. 1;

Fig. 5 is a transverse vertical section through the stereoscope, taken along the irregular line 5—5 of Fig. 1; and Fig. 6 is another transverse vertical section through the device, taken along the line 6—6 of Fig. 1.

While the invention has been shown and described herein as being applied to and embodied in a typical stereoscope for viewing a combination of two pictures and constructed of certain materials, it is not desired or intended to thereby unnecessarily restrict or limit the scope or utility thereof; and it is also contemplated that certain specific descriptive terms utilized herein shall be given the broadest possible interpretation consistent with the disclosure.

Referring to the drawing, the improved illuminated stereoscope shown therein comprises, in general, a unitary main casing 10 provided with spaced sight openings 11, 12 in the front end thereof and having the rear end open as at 13; an auxiliary unitary casing 14 insertable through the open end 13 of the main casing 10 for slidable confinement therein, the auxiliary casing 14 having a picture receiving slot or opening 15 adjacent the front end thereof and being substantially open at the front and bottom; illuminating means including a flashlight bulb 17 and one or more dry cell batteries 18 housed within the auxiliary casing 14 rearwardly of the picture receiving opening 15; and means such as a lever 19 pivotally coacting with the main casing as at 20 for slidably moving the auxiliary casing toward and away from the sight openings 11, 12 within the main casing 10.

Both the main casing 10 and the auxiliary casing 14 may be readily molded of plastic or the like with the auxiliary casing carrying the picture slide 22 and the illuminating means 17, 18 being readily movable longitudinally within the main casing by means of the lever 19 for focusing purposes. As shown, the upper wall of the main casing 10 is provided with a longitudinally extending slot 23 for receiving an intermediate projecting bearing portion 24 of the lever 19 which is journalled in or otherwise secured to the upper wall of the auxiliary casing 14 so as to transmit movement to the auxiliary casing upon swinging of the lever 19 about its pivot 20, the focusing lever being preferably provided with finger receiving depressions or apertures 25 at the opposite ends for convenient manipulation.

As indicated, the auxiliary casing 14 is provided with an upper transverse slot or opening 15 near the front thereof for receiving the picture slide 22 which, when inserted, is in alinement with the sight openings 11, 12 and is visible through the open front end of the auxiliary casing 14; and to shade and eliminate seepage of undesirable outside light to the pictures, the auxiliary casing may also be provided with a forwardly projecting shield 27. The auxiliary casing 14 is also provided with a reflector 28 which may be formed integral with the casing 14 a sufficient distance behind the slide receiving opening 15 to permit the reception therebetween of a suitable light socket 29 in the form of a sheet metal stamping or the like, the reflector being arcuately curved across the width of the casing 14 with the light socket 29 and bulb 17 being positioned medially thereof for uniform distribution of the light without interference with the picture display on the slide 22. The dry cell batteries 18 are insertable within the auxiliary casing 14 through the open bottom upon removal of the auxiliary casing from the main casing 10, such removal being readily effected by merely sliding the case 14 through the open rear end of the main casing 10 after the lever 19 has been detached in an obvious manner by removing the screw 30; and to render the unit more compact, the batteries 18 are disposed within the casing 14 transversely thereof and in parallel alinement with respect to each other rearwardly of the reflector 28.

To provide simple and inexpensive means for completing the electrical circuit and establishing contact between the bulb 17 and batteries 18, the light socket 29 is conveniently formed of sheet stock and is integrally associated with one of the contact plates 32 as shown in Fig. 6 while the other contact plate 33 carries an integral leaf spring switch 34 normally spaced from the contact button of the light bulb 17. To permit ready access to the spring switch 34 for manipulating the same to complete the circuit and effect illumination, the upper wall of the auxiliary casing 14 is provided with an aperture 35 adjacent the free contact end of the switch 34, and the top wall of the main casing 10 is formed with an opening 37 substantially across the entire width for permitting insertion of the slides 22 within the slot 15 of the auxiliary casing as well as for permitting manipulation of the switch 34. In addition, the front or forward end of the main case 10 is preferably recessed as at 38 centrally between the sight openings 11, 12 to allow clearance for the nose of the operator; and the wall at this recessed portion 38 preferably terminates some distance short of the top of the case 10 to provide a central upper opening or groove 39 in the front wall between the sight openings for reading any titles printed or otherwise carried on the slide 22.

Each of the sight openings 11, 12 are also provided with lenses 41, 42 respectively for magnifying and more clearly viewing the pictures on the slide 22; and to enhance the flexibility of the improved device and render the same more completely adaptable to varying conditions and diverse operators, these lenses 41, 42 are rendered transversely movable as hereinafter described. For facilitating independent adjustment of the lenses 41, 42, each lens is formed of generally heart-shape with the bottom portions thereof pivotally supported as at 43, 44 respectively on the inner lower wall of the case 10 and with an upper arcuate shoulder 45, 46 formed on the respective lenses being guided in similarly curved radii in the end wall of the case 10. The lenses 41, 42 are also respectively provided with upper central projections or manipulating knobs 48, 49 extending through transverse slots 50, 51 respectively formed in the upper wall of the case 10 above the sight openings, thereby permitting ready swinging movement of each lens 41, 42 about its respective pivot 43, 44 and transversely of the case 10; and each of these lenses may be quickly applied during actual assembly by merely inserting the projecting manipulating knob 48, 49 through its respective slot 50, 51 from the inside of the case 10 and forcing the lower end of the lense toward the front wall of the case until the lens snaps into place.

The operation of the device is believed apparent. First, the desired slide is selected and inserted in the slot 15. The lenses 41, 42 are then adjusted in accordance with the width of the operator's eyes by obvious manipulation of the projections 48, 49. The light 17 is then illuminated by means of the switch 34 in an obvious manner; and finally, as the pictures on the slide 22 are viewed, the device is focused by moving the auxiliary casing 14 to the proper position within the main casing 10 with the aid of the lever 19.

From the foregoing detailed description, it is believed apparent that the present invention provides an extremely simple and compact portable picture display device which is readily operable by a novice for viewing stereoscopic slides or the like in a most efficient manner under illumination. The improved device comprises an amazingly small number of parts which may be economically produced of inexpensive materials and which may be quickly and easily assembled and dismantled with the aid of only an ordinary screwdriver. Both the outside or main case 10 and the auxiliary case 14 may be formed of suitable plastic by projection moulding or the like, and the light receiving socket 29, contact plates 32, 33 and switch 34 may be readily stamped from suitable sheet metal having sufficient inherent resiliency to retain the same in position within the case 14. The lenses 41, 42 may likewise be produced in quantity at low cost, and may be assembled in an easy manner for independent adjustment. The focusing lever 19 may also be readily applied by merely positioning the detent forming the pivot 20 in the corresponding detent in the main case and by then securing the same to the auxiliary case with the aid of the screw 30. Devices constructed in accordance with the invention have proven exceedingly efficient, and can be manufactured and merchandized at extremely low cost.

It should be understood that it is not desired or intended to limit this invention to the exact details of construction or to the precise mode of use herein shown and described since various modifications within the scope of the appended claims may occur to persons skilled in the art to which this invention pertains.

I claim:

1. An illuminated portable picture display device comprising, a unitary main casing provided with spaced sight openings in one end thereof, an auxiliary casing slidably confined entirely within said main casing and having a picture receiving opening in the end adjacent to said sight openings, illuminating means housed entirely within said auxiliary casing remote from said sight openings, and means journalled on said auxiliary casing and pivotally coacting laterally of its journal axis with said main casing for moving said auxiliary casing toward and away from said sight openings entirely within the confines of said main casing.

2. An illuminated portable picture display device comprising a main casing provided with spaced sight openings in one end thereof and having an upper longitudinally extending slot therein, an auxiliary casing slidably confined within said main casing and having a picture receiving opening therein, illuminating means housed entirely within said auxiliary casing, and a focusing lever pivotally secured to said auxiliary casing through said longitudinal slot and pivotally coacting with said main casing for moving said auxiliary casing rectilinearly toward and away from said sight openings.

3. An illuminated portable picture display device comprising, a unitary main casing provided with spaced sight openings in one end thereof, an auxiliary casing slidably confined entirely within said main casing and having a picture receiving opening therein, illuminating means housed entirely within said auxiliary casing, and a focusing lever journalled at an intermediate portion on said auxiliary casing and pivotally coacting outwardly thereof with the top wall of said main casing laterally of its journal axis for moving said auxiliary casing toward and away from said sight openings.

4. An illuminated portable picture display device comprising, a main casing provided with spaced sight openings in the front end thereof, an auxiliary casing slidably confined within said main casing and having a picture receiving opening adjacent the front end thereof, a reflector located rearwardly of said picture receiving opening within said auxiliary casing, a light bulb housed within said auxiliary casing between said picture receiving opening and said reflector, a transversely disposed battery housed entirely within said auxiliary casing rearwardly of said reflector, means forming a positive connection between said bulb and one end of said battery, a leaf spring confined within said auxiliary casing and having one end thereof coacting directly with the other end of said battery while its opposite end is directly accessible through said main and auxiliary casings for distortion into engagement with said bulb to complete the electrical circuit, and means for moving said auxiliary casing toward and away from said sight openings.

5. An illuminated portable picture display device comprising, a main casing provided with spaced sight openings in the front end thereof and also having a transverse top opening, an auxiliary casing slidably confined within said main casing and having a picture receiving opening adjacent the front end thereof and a local aperture rearwardly of said picture receiving opening, the picture receiving opening and the local aperture both being disposed below and accessible through the transverse top opening of said main casing, a reflector located rearwardly of said picture receiving opening within said auxiliary casing, a light bulb housed within said auxiliary casing between said picture receiving opening and said reflector, a transversely disposed battery housed entirely within said auxiliary casing rearwardly of said reflector, means forming a positive connection between said bulb and one end of said battery, a leaf spring confined within said auxiliary casing and having one end thereof coacting directly with the other end of said battery while its opposite end is directly accessible through the transverse opening and the local aperture of said main and auxiliary casings respectively for distortion into engagement with said bulb to complete the electrical circuit, and means for moving said auxiliary casing toward and away from said sight openings.

JOHN E. GAULKE.

References Cited in the file of this patent

UNITED STATES PATENTS

| Number | Name | Date |
|---|---|---|
| 871,103 | Bridge | Nov. 19, 1907 |
| 1,042,346 | Henle | Oct. 22, 1912 |
| 2,071,120 | Harlow | Feb. 16, 1937 |
| 2,182,514 | Ciechanow | Dec. 5, 1939 |
| 2,484,591 | Rochwite | Oct. 11, 1949 |

FOREIGN PATENTS

| Number | Country | Date |
|---|---|---|
| 470,829 | France | June 24, 1914 |